H. COOPER.
CLUTCH MECHANISM.
APPLICATION FILED FEB. 25, 1911.
1,012,819.
Patented Dec. 26, 1911.
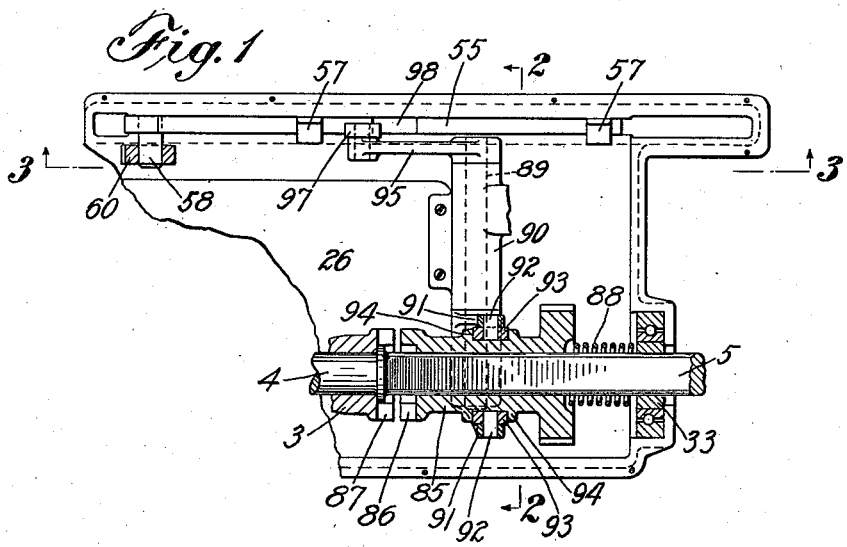
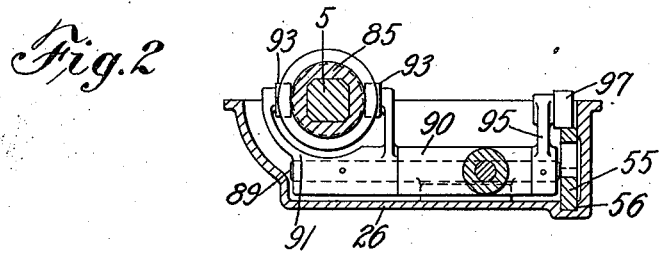
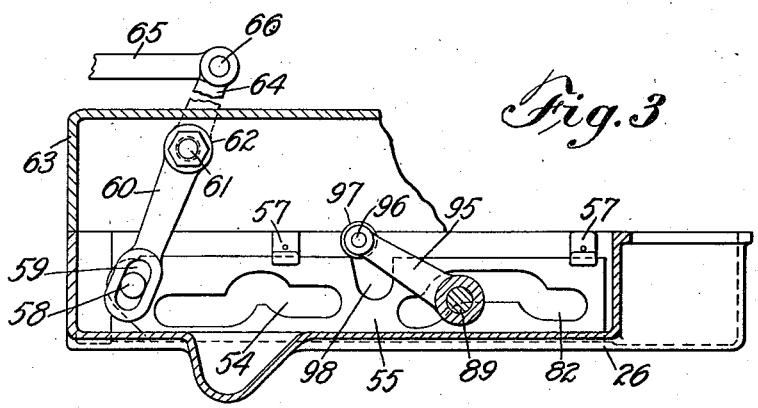
Attest
Frank H. Vick Jr.
Albert Thompson
Inventor
Herbert Cooper
by Sydney Prescott, Atty.

UNITED STATES PATENT OFFICE.

HERBERT COOPER, OF BROOKLYN, NEW YORK.

CLUTCH MECHANISM.

1,012,819.  Specification of Letters Patent.  Patented Dec. 26, 1911.

Original application filed December 31, 1910, Serial No. 600,347. Divided and this application filed February 25, 1911. Serial No. 610,664.

*To all whom it may concern:*

Be it known that I, HERBERT COOPER, a citizen of the United States, residing at Brooklyn, county of Kings, and State of New York, have invented a new and useful Improvement in Clutch Mechanism, of which the following is a specification.

This invention relates to an improvement in clutch mechanism, particularly to the type of clutches used in connection with transmission gearing such as that disclosed in my co-pending application filed December 31, 1910, Serial No. 600,347, of which this application is a division.

The invention consists in certain constructions and combinations which will be hereinafter fully described and then specifically set forth in the claims hereunto appended.

In the accompanying drawings, which form a part of this specification and in which like characters of reference indicate the same or like parts, Figure 1 is a plan view of a device, with certain parts shown in section, constructed in accordance with the invention, Fig. 2 is a sectional view taken on the line 2—2 in Fig. 1, and Fig. 3 is a sectional view taken on the line 3—3 in Fig. 1.

The device selected to illustrate the invention forms a part of a complete system of transmission gearing fully described in the above application, to which reference is made for a full disclosure of said system and the relation of this invention thereto. In order to support the various elements of the structure, there is provided a casing 26. A plate 55 is provided which is arranged to reciprocate in a groove 56 formed in the side of the casing 26 and in guide blocks 57 fast to the casing. For the purpose of moving the plate 55, there is provided a stud 58 fast in one end of the plate and arranged to engage a slot 59 in the lower end of an arm 60. This arm is fast on a short shaft 61 journaled in a bearing 62 formed in a cover 63, which cover is shaped to fit the casing 26 and inclose the mechanism. Upon the outer end of the shaft 61 is secured an arm 64, and motion is transmitted to the arm by means of a connecting rod 65 pivoted at 66 to the arm. It is to be understood that the connecting rod may lead to any convenient point and be operated by a lever or other suitable device not shown.

A shaft having a cylindrical section 4 and a substantially square section 5 is provided, and this shaft is arranged to support two clutch member in constant alinement. To this end, there is provided a sleeve 3 rotatably mounted on the cylindrical section of the shaft 4—5, and this sleeve carries a clutch member 87. There is also provided a slide 85 mounted on the square section of the shaft 4—5, and this slide carries a clutch member 86 arranged to engage the member 87 when the sleeve and slide are moved toward each other. Means are provided for moving the slide member 86 into engagement with the sleeve clutch member 87 and consists in a spring 88 coiled around the shaft 4—5 and bearing against a bearing 33 and the end of the slide 85. It is desirable that this spring be normally held out of action. For this purpose, there is provided a shaft 89 journaled in a bearing 90 rising from the casing 26. Upon one end of this shaft is fixed a fork 91 extending upwardly on either side of the slide 85 and carrying studs 92 upon which bowls 93 are mounted. These bowls engage an annular channel 94 cut in the slide 85. Upon the opposite end of the shaft 89 is fixed an arm 95 which carries at its free end a stud 96. This stud carries a bowl 97 which rides on the upper edge of the plate 55. A cam slot 98 is cut in the plate, into which the bowl 97 will drop when the plate is moved to the left, Fig. 3, thus releasing the spring 88 and permitting it to act to move the slide 85 toward the sleeve 3 to throw the clutch members into engagement. A reverse movement of the plate 55 causes the bowl 97 to ride up to the upper edge of the plate 55, thus compressing the spring 88 and holding it out of action. The plate 55 is provided with cam slots 54 and 82 which in the transmission gearing above referred to are used to control the movement of parts other than the clutch mechanism herein specifically described.

Changes and variations may be made in the structure by means of which the invention is carried into effect. The invention, therefore, is not to be restricted to the precise details of the structure shown and described.

What is claimed is:—

1. In clutch mechanism, the combination with a solid shaft of substantially equal strength throughout its length and having a cylindrical section and a substantially square section, of a sleeve rotatably mounted on the cylindrical section and carrying a clutch member, a slide mounted on the square section and carrying a clutch member, means for producing a relative movement of the sleeve and slide to throw the clutch members into engagement, and independent cam operated means normally holding the members out of engagement.

2. In clutch mechanism, the combination with a solid shaft of substantially equal strength throughout its length and having a cylindrical section and a substantially square section, of a sleeve rotatably mounted on the cylindrical section and carrying a clutch member, a slide mounted on the square section and carrying a clutch member, means for moving the slide on the square section to throw the members into engagement, and independent cam operated means normally holding the members out of engagement.

3. In clutch mechanism, the combination with a solid shaft of substantially equal strength throughout its length and having a cylindrical section and a substantially square section, of a sleeve rotatably mounted on the cylindrical section and carrying a clutch member, a slide mounted on the square section and carrying a clutch member, a spring coiled around the shaft and bearing against the slide for moving it to throw the members into engagement, and independent cam operated means normally holding the members out of engagement.

4. In clutch mechanism, the combination with a solid shaft of substantially equal strength throughout its length and having a cylindrical section and a substantially square section, of a sleeve rotatably mounted on the cylindrical section and having a clutch member integrally formed thereon, a slide mounted on the square section and having a clutch member integrally formed thereon, a spring coiled around the shaft and bearing against the slide for moving it to throw the members into engagement, and independent cam operated means normally holding the members out of engagement.

5. In clutch mechanism, the combination with a shaft having a cylindrical section and a substantially square section, of a sleeve rotatably mounted on the cylindrical section and carrying a clutch member, a slide mounted on the square section and carrying a clutch member, a spring coiled around the shaft and bearing against the slide for moving it to throw the members into engagement, and cam operated means including a fork engaging the slide for normally holding the members out of engagement.

6. In clutch mechanism, the combination with a shaft having a cylindrical section and a substantially square section, of a sleeve rotatably mounted on the cylindrical section and carrying a clutch member, a slide mounted on the square section and carrying a clutch member, a spring coiled around the shaft and bearing against the slide for moving it to throw the members into engagement, a fork engaging the slide, a shaft carrying the fork, an arm carried by the shaft, and a cam engaging the arm to normally hold it in position to hold the clutch members out of engagement.

7. In clutch mechanism, the combination with a shaft having a cylindrical section and a substantially square section, of a sleeve rotatably mounted on the cylindrical section and carrying a clutch member, a slide mounted on the square section and carrying a clutch member, a spring coiled around the shaft and bearing against the slide for moving it to throw the members into engagement, a fork engaging the slide, a shaft carrying the fork, an arm carried by the shaft, and a reciprocating cam engaging the arm to normally hold it in position to hold the members out of engagement.

In testimony whereof, I have signed my name to this specification in the presence of two subscribing witnesses.

HERBERT COOPER.

Witnesses:
FRANK H. VICK, Jr.,
C. E. MARTIN.

---

Copies of this patent may be obtained for five cents each, by addressing the "Commissioner of Patents, Washington, D. C."